United States Patent [19]

Royka et al.

[11] 3,877,155

[45] Apr. 15, 1975

[54] RESPONSIVE ANSWER SYSTEM

[75] Inventors: Stephen F. Royka, Fairport; Robert G. Martin, Rochester, both of N.Y.

[73] Assignee: Xerox Corporation, Rochester, N.Y.

[22] Filed: June 26, 1967

[21] Appl. No.: 648,701

[52] U.S. Cl. .................................. 35/9 R; 35/48 A
[51] Int. Cl. ............................................ G09b 3/02
[58] Field of Search ........... 35/9, 48, 48.1, 2; 283/6

[56] References Cited

UNITED STATES PATENTS

| | | | |
|---|---|---|---|
| 356,695 | 1/1887 | Reid et al. | 283/6 |
| 3,055,117 | 9/1962 | Bernstein et al. | 35/9 |
| 3,364,857 | 1/1968 | Lien et al. | 96/1 X |

*Primary Examiner*—Wm. H. Grieb

[57] ABSTRACT

Permanent, meaningful information is so associated with removable, confusing information, at least some of which is usually similar in character to said permanent, meaningful information, as to make it effectively impossible for an observer to discriminate between the two types of information even though both types of information in the association may be legible. Such a system is advantageously used in instructional systems and particularly in responsive answer formats.

8 Claims, 5 Drawing Figures

PERMANENT MEANINGFUL INFORMATION PLUS REMOVABLE CONFUSING INFORMATION.

A. TRUE
Y NO
E
S
WRONG

B. FALSE
N YES
O
RIGHT

PERMANENT MEANINGFUL INFORMATION

A. Y
E
S

B. N
O

INVENTORS
STEPHEN F. ROYKA
ROBERT G. MARTIN
BY David C. Petre
James J. Ralabate
ATTORNEYS INVENTORS
STEPHEN F. ROYKA
ROBERT G. MARTIN
BY David C. Petre
James J. Ralabate
ATTORNEYS INVENTORS
STEPHEN F. ROYKA
ROBERT G. MARTIN
BY David C. Petre
James J. Ralabate
ATTORNEYS

RESPONSIVE ANSWER SYSTEM

BACKGROUND OF THE INVENTION

This invention relates to instructional systems and more particularly to responsive answer sheets, their manufacture and use.

Educational researchers have increasingly looked to the use of self-instructing and testing materials for teaching aids. One device that incorporates many of the advantages of such materials and which has thus found great favor with researchers, is where typically a student is supplied with textual material comprising the lesson to be comprehended, followed by a series of questions intended to demonstrate to the student and possibly to others whether the student has grasped the lesson. These materials, including programmed learning texts, have many inherent advantages including: no direct assistance of an instructor is required and each student may proceed at a rate comfortable to him.

Typically, in programmed learning, if right, the student proceeds to the next question; if wrong, he learns further from feedback information in the response area that he chose, as to why he was wrong. With such materials, it is usually desirable to quickly furnish the student with a correct answer, in order for the student to verify his own response, thereby reinforcing the learning process and preventing what is known as "negative feedback" which is at least a partial acceptance by the student of a plausible wrong answer is generally thought to occur when the correctness of the student's choice is not quickly verified.

An advantageous way of achieving the above desired results is to place the correct responses adjacent the questions but under some temporary concealing cover that may be removed by the student after preparation of his own answer, to yield a permanent underprinting which indicates whether the student's answer is right or wrong. This approach has many advantages in addition to those mentioned earlier including preventing negative feedback and providing for a self-corrected test under certain formats and enabling the examiner to follow precisely the candidate's procedure in answering a question, thus credit may be given for even partially correct work.

The prior art suggests a number of ways of concealing the responses in the above suggested manner. Buitenkant U.S. Pat. No. 2,764,821 speaks generally of a removable opaque covering; Neville et al. Pat. No. 2,986,820 teaches a discontinuous permanent underprinting associated with an erasable discontinuous opaque overprinting; Neville et al. U.S. Pat. No. 2,961,777 describes an erasable opaque overlayer in conjunction with an interlayer between the overlayer and the permanently printed information, the interlayer comprising a transparent barrier layer resistant to erasure, in the form of an ink containing a vehicle and a pigment; and Bernstein et al. Pat. No. 3,055,117, which describes a discontinuous opaque erasable confusion pattern with at least 50 percent of said permanent underprinting being physically covered by the pattern. While the above teachings are advantageous in some respects, they have inherent disadvantages including the requirement of an erasable either continuous or discontinuous opaque overprinting to physically block out, occlude or optically obscure as to render illegible the underprinting, optionally with special discontinuous permanent underprinting or specially applied protective interlayers between the permanent underprinting and the erasable obscuration overprinting. With such materials, often a relatively extensive amount of obscuring matter must be erased to bare the underprinting.

Copending application Ser. No. 604,749, filed Dec. 27, 1966 now abandoned, describes an improved responsive answer sheet and advantageous method of making same employing the process of xerography, but this approach also teaches either a continuous or discontinuous, removable obscuration overprinting.

There is a continuing need for a better and simpler responsive answer sheet system.

SUMMARY OF THE INVENTION

It is, therefore, an object of this invention to provide a responsive answer sheet system which overcomes the above-noted deficiencies and satisfies the above-noted wants.

It is a further object of this invention to provide a responsive answer sheet system which does not require but may optionally employ discontinuous or continuous removable obscuration overprinting.

It is a further object of this invention to provide a response answer sheet system which may be applied to the sheet by any suitable imaging system and preferably by xerography.

It is a still further object of this invention to provide a responsive answer sheet system which does not necessitate accurate registration between the permanent information and that portion of the sheet intended to confuse beyond comprehension the premanent information.

It is a still further object of this invention to provide a technique whereby responsive answer sheets may be manufactured by extremely simple and readily available means.

It is a still further object of this invention to provide a responsive answer system where the permanent, meaningful information need not be physically obscured to the point of unintelligibility.

The foregoing objects and others are accomplished in accordance with this invention by providing permanent, meaningful information so associated with removable, confusing information at least some of which is usually similar in character to said permanent, meaningful information as to make it effectively impossible for an observer to discriminate between the two types of information even though both types of information in the association may be legible. Such a system is advantageously used in instructional system and particularly in responsive answer formats where a student may erase or otherwise remove the removable information to bare the permanent, meaningful information. Permanent information is that information which remains readily observable after the removable information has been substantially removed from the response area. The invention concept hereof confuses not by physical blocking as taught by the prior art, but by compounding, associating (including disarranging) permanent information with confusing information, usually at least some of which is similar in character to the permanent information as to render it impossible to tell which is permanent and which is removable confusing information. In the invention, generally no attempt is made to designedly physically cover the permanent information, but to confuse it beyond interpretation by the presentation of extraneous removable, confusing information.

Also, a part of the invention is the use of xerography and a particular fusing system in xerography to make resonsive answer sheets according to the invention.

The invention may take many forms including:

a. in a format with one response area to a given question, intentionally misregistering permanent, meaningful information and removable, confusing information, of like character, the removable information being contiguous to the permanent information, but not in exact register therewith, to present a composite array of information wherein the permanent information is generally not physically covered or blocked to the point of illegibility but is disarranged in the removable confusing information to a degree where it is impossible for an observer to systematically discriminate between the permanent information and the removable information, for example, putting a T and an F in a response area, i.e. F, with one letter permanently printed and the other removably printed according to the result desired;

b. in a format with a plurality of response areas to a given question, for example, in typical True-False or multiple choice formats, permanently print information to indicate correctness (for example a "C" or "T" or "True" or "Yes") in that response area(s) corresponding to the correct answer and removably printing information which includes information similar to said information to indicate correctness; as illustrated in FIG. 1; and other variations, some of which are set out herein.

Other specific modes of practicing this invention will occur to those skilled in the art. Optionally, the response area can also have obscuration overprinting as taught by the prior art, which may serve to further confuse the eye in addition to accentuating the response area.

BRIEF DESCRIPTION OF THE DRAWINGS

For a better understanding of the invention as well as other objects and further features thereof, reference is made to the following detailed diclosure of this invention taken in conjunction with the accompanying drawings wherein.

DESCRIPTION OF THE PREFERRED EMBODIMENTS

Figures 1A, 1B, 4:
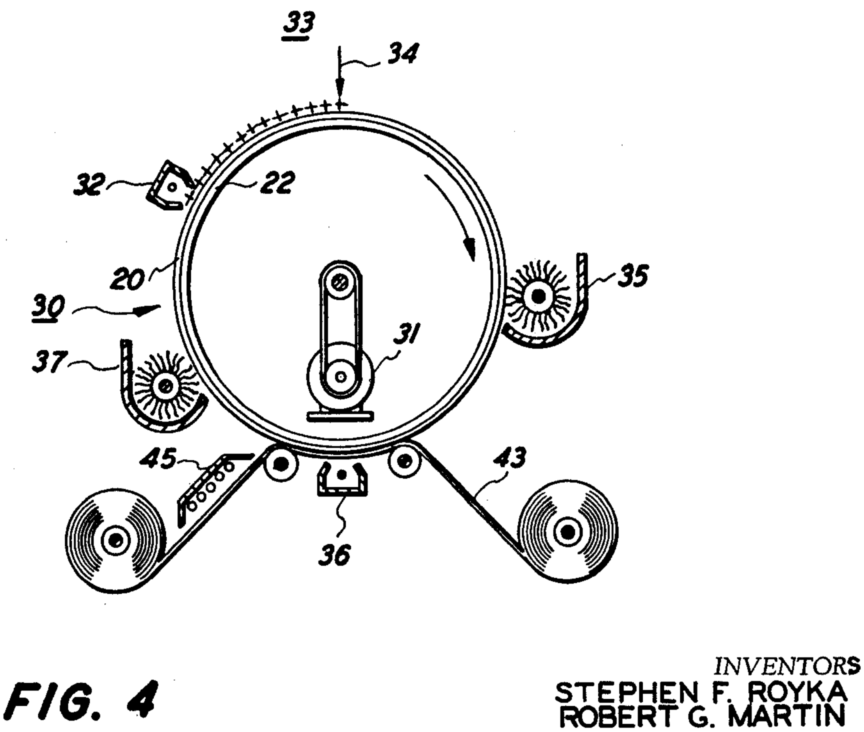
FIG. 1A illustrates two response area, to a given question, before removing action by the student.
FIG. 1B shows the permanent information in the two response areas after the removable information is removed.
FIG. 4 is a partially schematic illustration of an automatic imaging machine employing the process of xerography which is a preferred mode of printing removable and specifically abradably removable confusing information according to the invention.

Referring now to FIG. 1A, there is shown two response areas A. and B. containing both permanent and removable information. In FIG. 1B there is shown only the permanent information remaining after the removable information has been removed by erasing each response area with an erasure. The permanent information "YES" in response area A. indicates that A. was the correct answer to a question corresponding to response areas A. and B. The "NO" in response area B. indicates that B. is the wrong or less desirable response.

Figure 2:
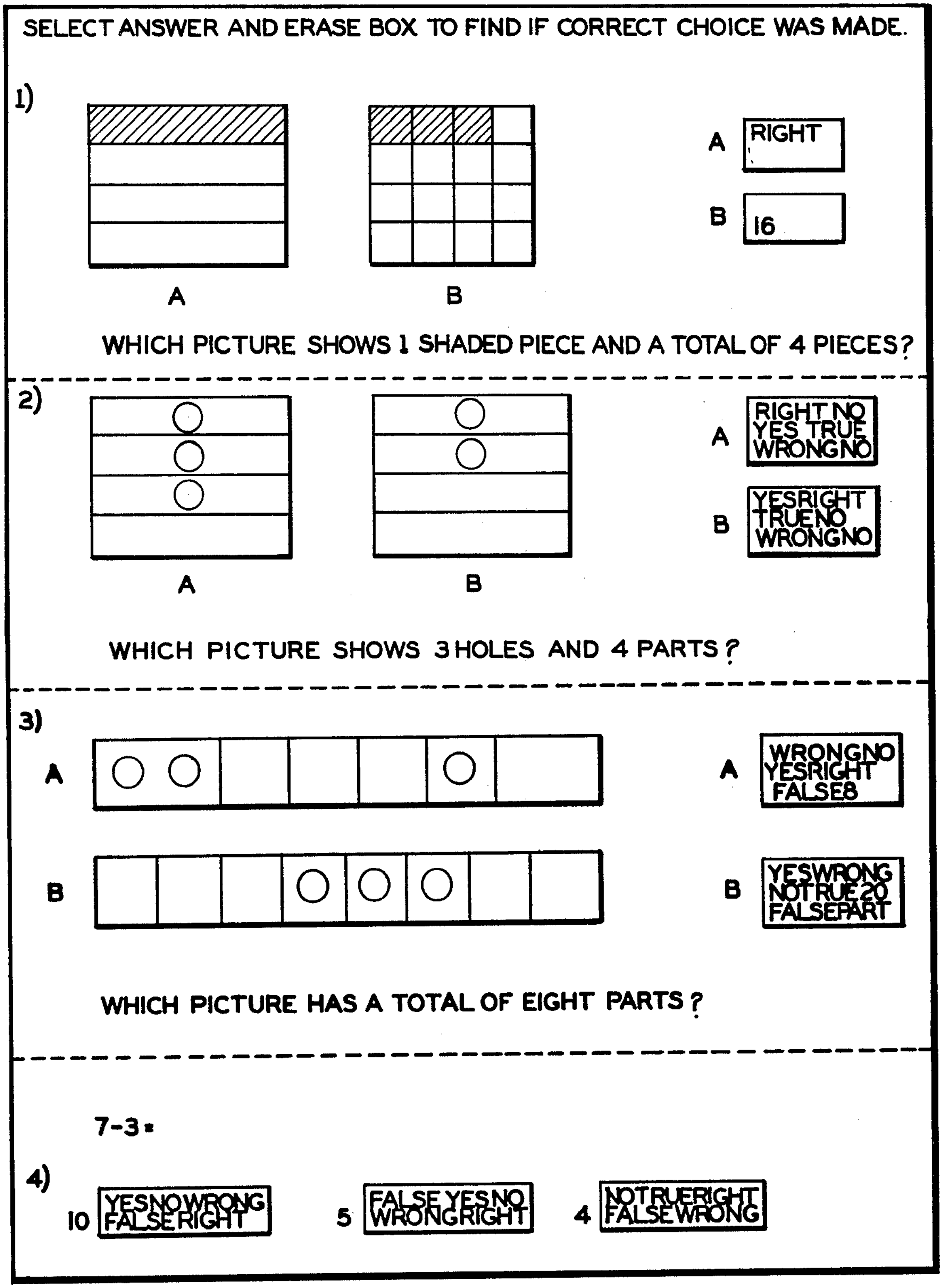
FIG. 2 illustrates another responsive answer format, with questions, employing an embodiment of the invention.

Referring now to FIG. 2 there is shown four, combined question and response area locations, numbered (1) through (4). In location (1), both response areas have been erased to show that response area A is correct and to show that response area B is the wrong answer and contains the number "16" to refer the student to a page of remedial or enrichment information. In locations (2) through (4), the response areas are shown with disarranged permanent, meaningful information and removable, confusing information so as to render it impossible for the student to tell which response area is correct until he has removed or erased away the removable information to bare the permanent information.

Figure 3:
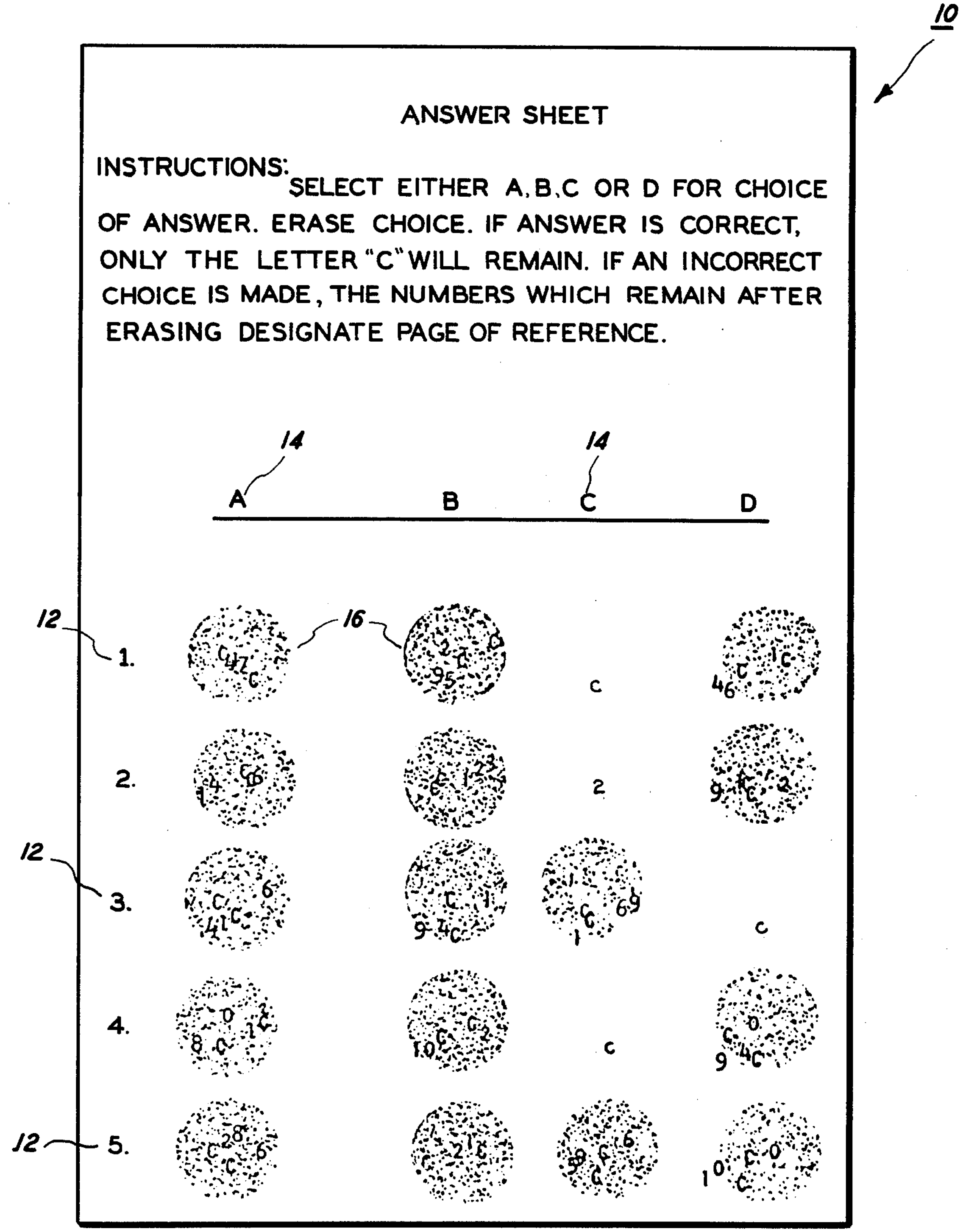
FIG. 3 illustrates another responsive answer format, without questions, comprising permanent, meaningful (alpha-numeric) information associated in four response areas for each question with erasable information of the same character (alpha-numeric) as the permanent information, the response areas in circular form accentuated by a discontinuous obscuring overprinting.

Referring now to FIG. 3, there is shown illustrative responsive answer sheet 10. Typically such a sheet 10 would appear in a programmed text or the like or may be the means of recording test results from questions directed from a text or from an instructor or from any other suitable source and is seen to comprise a series of five answering rows 12, each row comprising four response areas 16 which are parts of columns 14 of response areas. Typically a number of such columns will appear on the sheet. In the drawing, response areas A, B, C and D, respectively, are shown comprising each answering row. Again, typically a student will be expected to respond on the answer sheet 10 to a corresponding numerically numbered question concerning the text he has just read or, for example, concerning material which an instructor now wishes to test the student upon. In the illustrated responsive answer sheet, the student would thus be expected in answering question 1 to choose a response under one of the four columns A–D, each of the response areas generally corresponding to one of a group of multiple choice answers to the numbered question 1, which may include plausible wrong answers, and are presented to the student or examines before he makes his choice. Typically, only one such response A–D is actually correct and after erasing his choice of a correct response area, the student will know that he has chosen the correct response A–D by baring after erasure of the removable information, the permanently printed "C".

Illustratively, answering row 1, indicates that the student's first choice of response area C corresponding to answer C is correct because of the baring of "C" in the response area after the student has erased away the removable confusing information. Answering row 2. indicates that a wrong choice was made and the bared number "2" indicates a page of enriching information. Answering rows 3. and 4. indicates correct choices and answering row 5. contains 4 response areas as they would appear to the student before he has made his choice by initiating removing action. Typically, in each answering row, three of the responses A–D will be incorrect and will thus have the "C" removably printed, optionally associated with other removable confusing information and permanent enrichment information, and one response A–D will be the correct response and will have the "C" printed permanently with the other surrounding information preferably printed removably on the answer sheet. Typically, the three incorrect responses included in the responses A–D in an answering row may optionally also have permanent information printed in the three wrong response areas, typically containing information indicating to the student that his response is incorrect and as illustrated, optionally referring the examinee to page numbers of a text which will explain to him why his choice was incorrect. In one testing use hereof, if the examiner's initial choice is an incorrect one, he may be instructed to make further choices until he uncovers the correct answer, which provides a self-correcting testing operation, a perfect answer sheet being evidenced by a number of erased response areas 16 equaling the number of answering rows 12, shown to be five in number, in FIG. 3, and a zero score typically evidenced by an answer sheet wherein each incorrect response area has been erased, with various intermediate grades corresponding to intermediate number or erasures evidenced on the sheet.

While it is understood that the present invention is in no way to be limited to the responsive answer sheet use illustrated in FIG. 3, the use illustrated is presented because the invention is particularly useful when employed in this respect. Instead, the invention is intended to cover a manner of associating together permanent, meaningful information and removable confusing information to a degree where comprehension, before removing the removable confusing information is impossible. In some variations of the invention, at least some of the removable information must be similar or of a like character to the permanent information in order to confuse an observer.

"Like character" for example, is intended to mean, where the correct response is alpha-numeric in character at least some of the removable confusing information associated with or disarranged with the permanent informative information will also be alpha-numeric in character.

"Like characters" is in contradistinction to the removable confusing information of the prior art which was in the form of a pattern, the sole purpose of which was to sufficiently block out the permanent underprinting and which itself, did not contain possible meaningful information, typically alpha-numeric in character.

In reference to FIG. 3, by reason of the format used, at least the letter "C" must be removable printed in the three incorrect responses of each answering row. As a variation in the format of FIG. 3, each response area could be printed only with the letter "C" with the correct answer being permanently printed and the incorrect answers being erasably printed. Where the permanent meaningful information is a particular type of diagram, for example, a particular electrical circuit diagram which best answers a particular question, the wrong or less desirable electrical circuits by this invention would be erasably printed in the remaining response areas of the particular answering row.

Many variations of the present invention are available including such an interesting approach as having a response area comprising a face with a substantially round or oval mouth, response areas corresponding to incorrect answers having the topmost portion of the mouth permanently printed and the bottom portion removably printed which upon removal of the removable information leaves the topmost portion of the mouth and a sad, or frowning face to indicate an incorrect answer.

A response area corresponding to a correct answer would typically have the bottom portion of the mouth permanently printed and the top portion of the mouth removably printed, which upon removal of the removable information, for example by erasing, leaves the bottom-most portion of the mouth and a smiling or happy face to indicate a correct answer.

Although, as illustrated in FIG. 3, circular obscuration patterns are used to accentuate the response areas 16, this use of an overlying obscuration layer or pattern is entirely optional herein and may be employed only where desirable. They may be desirably employed in those cases where there is some visible difference between the appearance of the removable and the permanent information. In such cases, obscuration patterns may aid in lessening these differences to the point of unintelligibility. It is to be understood also, because the purpose of such an obscuration pattern herein is not to act as the sole means of obscuring the permanent meaningful information, for example, as is the case in the Bernstein et al. U.S. Pat. No. 3,055,117 where it is specified that at least 50 percent of the permanent answer may be covered to effectively obscure, a percentage coverage less than 50 percent may often prove effective. Also the pattern need not be removably printed if the permanent information is sufficiently bared to be observable by removing the removable information of a like character.

It is clear that this invention requires a means of placing permanent information of a sheet and removable information on the same sheet as described herein, wherein the general appearance or feel of this sheet after it is made up is sufficiently similar in the permanently printed and removably printed areas, so as to be impossible for the casual observer and desirably for a more scrutinizing examinee to determine which information is permanently and which is removably printed.

In this regard, it is found that the process of xerography and commercially available imaging machines employing said process provide a preferred system to practice the invention. In the process of xerography, for example, as disclosed in Carlson U.S. Pat. No. 2,297,691: a xerographic plate comprising a layer of photoconductive insulating material on a conductive backing is given a uniform electric charge over its surface and is then exposed to a light and shadow image pattern of the subject matter, the original, to be reproduced usually by conventional projection techniques. This exposure discharges the plate areas in accordance with the radiation intensity that reaches them and thereby creates an electrostatic latent image on or in the photoconductive layer corresponding to the light and shadow image pattern. Development of the latent image is effected with an electrostatically charged, finely divided material, such as an electroscopic powder, that is brought into surface contact with the photoconductive layer and is held thereon electrostatically in a pattern corresponding to the electrostatic latent image. The developed, xerographic marking material image may be fixed or made permanent on the xerographic plate itself. Alternatively, if it is desired, to apply the developed xerographic powder image to paper, metal foil, plastic film or other transfer material, the developed image may be transferred from the xerographic plate to such a support surface to which it may be affixed by any suitable means.

Referring now to FIG. 4, there is shown a schematic illustration of an embodiment of automatic xerographic copying apparatus, wherein a xerographic plate comprising a photoconductive layer 20, for example, comprising amorphous selenium or zinc oxide in a binder on a conductive substrate 22 in the form of a drum 30 is rotated by a motor 31 and sequentially passes a sensitizing station 32 illustrated as a corona discharge device depositing illustratively positive charge on the plate, an exposure station 33 where an optical image illustrated by light ray 34 is projected onto the surface of the charged drum, a developing station 35 depicted as a brush development device, a transfer station 36 illustratively using a corona device for electrostatic transfer and a cleaning station 37 depicted as a brush cleaning device.

At exposure station 33, the imagewise illuminated areas of the drum become more electrically conductive and at least partially discharge the surface of drum 30 in said areas to thereby create a latent electrostatic image corresponding to the optical image which is rendered visible or developed at developing station 35 and then transferred to a transfer web at transfer station 36. The transferred image on web 43 is fixed at fixing station 45 depicted as a heat fixing device. After transfer of the image, residual developer is removed from the xerographic drum surface at cleaning station 37 and the drum is then resensitized by corona charging at sensitizing station 32 to prepare it for another imaging cycle.

Generally, the latent electrostatic image is rendered visible or developed by contacting the latent image areas with a finely divided marking material that is brought into surface contact with the free surface of the photoconductor and is held thereon electrostatically in a pattern corresponding to the latent electrostatic image. For example, the system of cascade development has found extensive commercial acceptance and is also suitable herein and generally consists of gravitationally flowing developer material consisting of a two component material of the type disclosed in Walkup et al. U.S. Pat. No. 2,638,416 over the xerographic plate bearing the latent image. The two components consist of an electroscopic marking powder termed "toner" and a granular material called "carrier" and which by mixing acquire triboelectric charges of opposite polarity. In development, the toner component usually oppositely charged to the latent image is deposited on the latent image to render that image visible. Other typical developing systems include magnetic brush development, for example, see Giamo U.S. Pat. No. 2,930,351; skid development, for example see Mayo U.S. Pat. No. 2,895,847; fluid development systems, for example see Carlson U.S. Pat. Nos. 2,221,776, 2,551,582, 2,690,394, 2,761,416, 2,928,575; Thompson U.S. Pat. No. 3,064,622; Gundlach U.S. Pat. Nos. 3,068,115 and 3,084,043 and Metcalfe U.S. Pat. Nos. 2,907,674, 3,001,888, 3,032,432 and 3,078,231 and other development processes known to those skilled in the art.

One of the advantages of the xerographic process which makes it particularly adapted to the practice of the present invention in that, at fusing station 45, the toner image may be permanently printed or fused into transfer material 43 or may be removably fused therto by regulating the parameters of the fusing process and proper selection of toner, to produce answer sheets in accordance herewith wherein a casual observer will not be able to tell which information is permanently fused and which is removably fused.

Typically, responsive answer sheets according to the invention, may be manufactured utilizing xerography, by a two run process comprising first routing a support material, for example paper, which when processed according to the invention is to be the responsive answer sheet, through the xerographic imaging machine and imprinting thereon permanent meaningful information in those areas where it is to be applied to the supporting substrate depending on the particular format chosen. Typically, this information may be printed by the proper selection of an original master-type document which contains said permanent meaningful information, an optical image of which is projected, illustrated by light rays 34, onto the xerographic drum at the exposure station 33 and which results in an imaged sheet containing the permanent, meaningful information. The marking material image is permanently fixed to the transfer sheet by any suitable means and, for example, as illustrated in FIG. 4, by regulating the amount of heat energy absorbed by the toner from the resistance wire heat fixing device illustrated, more specifically described in Eichler U.S. Pat. No. 2,965,868, to permanently fix the toner image to the transfer sheet.

Then this transfer sheet containing permanent meaningful information is re-routed through the machine and the removable, confusing information is placed thereon by conventional xerographic techniques with the sole change generally being that the fusing mechanism in the machine is changed from the first run and precisely controlled so that the transfer toner image becomes affixed to the transfer sheet 43 in a semi-permanent or removable manner. In the illustration, a resistance wire heat fixing unit is used and this semi-permanent or removable fixing is brought about by controlling the total heat energy supplied to the transfer surface and the toner so that only a sufficient fusing takes place to essentially tackify toner particles to the base without at the same time causing the particles to collect into a uniform mass and to become at least partially absorbed into the transfer base material itself which would result upon cooling in, what is known in the art, as a permanent xerographic image and one which may not be readily abradably removed by using ordinary techniques. Where fusing is accomplished in the accordance with the present invention, the removably imprinted xerographic image is removable with relative ease so that, in fact, it becomes possible for the student to readily remove the removably printed confusing matter be merely rubbing a response area with an ordinary pencil eraser or scraping with a knife or blade or other suitable abrading means.

The degree of permanentness of a xerographic toner image has been classified in a variety of ways in the art including the class 1 through class 4 degrees used in Insalaco U.S. Pat. No. 3,130,064 wherein a class 1 fix is where the toner particles rest on the surface as discrete unglazed particles of powder, a minor degree of melting has taken place only to the extent that surface irregularities in the toner particles have been smoothed out; a class 2 fix is one wherein the toner particles are glazed but still exist as separate particles on the image support member; a class 3 fix is one wherein the electroscopic toner particles are glazed and wherein the affected particles have lost their boundaries, that is they have merged together and to the surface of the image support member by being partially absorbed therein and a class 4 fix wherein the toner particles have so merged and penetrated the image-support material that the separate fibers of image-support material can be seen through the fused toner particles. For most commercial applications of xerography a class 3 a fix is adequate, although in many instances a class 4 fix is actually accomplished.

Thus, for xerographically forming the permanent, meaningful information according to this invention, the toner making up said permanent information, typically will be fixed to a class 3 or higher degree of fix. The toner making up the removable information, typically will be fixed to less than a class 3 fix and preferably in the range of from a class 1 fix to a class 2 fix, inclusive. In this range, the toner particles have been sufficiently heated so that a minor degree of melting has occurred, —sufficient to tackify the individual particles to the substrate or portions of the permanently printed image and also sufficient to achieve some minor tackification between individual toner particles at their points of mutual contact. However the individual particles have not in general lost their individual boundaries and started to flow together into a smooth coalesced mass. Thus, we are clearly below the stage of a class 3 fix. Under such circumstances, removably fixed particles may be removed by merely supplying sufficient energy to disrupt the tackification bonds between individual particles and the substrate. Typically such energy may be supplied by merely abrading the particles with a conventional eraser. Alternatively however, a mild solvent such as, for example, trichlorethane—in which conventional toner compositions such as that described in Example I of Insalaco U.S. Pat. No. 2,892,794 are slightly soluble, may be applied to the answer sheet as for example with a fabric-tipped instrument or the like.

Although the method of heat fusing has been particularly described herein, any suistabe method of fixing and regulating the fix of a xerographic image may be used. Typical fixing means which may be readily adapted either alone or in combination with other methods specified herein, to practice the invention include: infra red heating sources as described in Roshon U.S. Pat. No. 2,807,793 and Allen et al. U.S. Pat. No. 2,807,704; the combination of heat and pressure as illustrated by Carlson U.S. Pat. No. 2,990,278 and Aser et al. U.S. Pat. No. 3,291,466; the vapor plus pressure fixing as described by Walkup U.S. Pat. No. 2,995,085; or solvent vapor alone as described in Greaves U.S. Pat. No. 2,726,166 and others. One method of fixing may be used to fix permanent information and a different method to fix the removable information on the same surface, the fixing means to fix the permanent information being chosen to give a deeper toner penetration into the support surface such as solvent fixing or oven fusing with the removable information being fixed by low temperature pressure rollers which would adequately fix the toner but be more subject to removal from the paper than the permanent information since fiber penetration would be less. Another way of controlling the degree of fix is to use toners of varying melting points, for example, using a crystalline toner in combination with a heat-pressure fixing means with the toner heated below its melting point to removably fuse and the heated roller heated sufficiently to raise the toner above the melting point to permanently fuse.

Although xerography is eminently suitable for the practice of the present invention, it is clear that any suitable system for associating permanently printed information with removable information may be used. For example, the permanent information hereof may be printed by letterpress or by lithography or by gravure with the removable confusing information being put on by xerography, or both the permanent informative information and the removable confusing information may be put on by the above non-xerographic printing methods with erasability being provided by the use of release or slip coatings being coated selectively on the paper where the removable information is to be printed during a second run or optionally being coated over the entire surface of a copy sheet after it has been permanently printed upon.

In this regard although it is possible to vary the fixation level of the fixing apparatus in a piece of xerographic equipment to provide for permanent and removable confusing information, for example, by changing heat fuser temperature and energy input in xerographic apparatus employing heat fusing apparatus or by regulating the exposure intensity of a solvent or solvent vapor in a vapor fusing apparatus, trials have shown that control may be critical and parameters may change depending upon moisture content of the paper, amount of toner on the paper, and other environmental conditions.

In this regard, it has been found to be a preferred xerographic mode of practicing the invention, and one wherein the permanent and removable information may be imprinted in a two run operation, without regulating the heat fusing apparatus of a xerographic imaging apparatus, to treat the transfer surface with a toner release or offset preventing agent between printing the permanent information and printing the removable information in a two run process of preparing a responsive answer sheet and preferably treating the transfer surface during the initial permanent printing operation itself, which treatment would retard the removable xerographic image from penetrating into the paper fibers upon final fixation during the second run. Preferably, this transfer surface treatment taken the form of applying a thin layer of a toner release oil such as the non-particulate liquid dimethyl polysiloxane known as silicone oil, to the paper. If heat-pressure fusing is used, the oil is preferably applied to a pressure roller preferably surface layered with an offset preventing material such as a tetrafluoroethylene fluorocarbon available from DuPont under the trademark Teflon, which contacts the toner bearing side of the transfer surface and then transfers some of the oil to the paper which is the technique employed in the commercially available xerographic imaging apparatus available under the trademark Xerox 2400 from the Xerox Corp. and is described more fully in Aser et al. U.S. Pat. No. 3,291,466. When a subsequent image is applied to this paper, the silicone oil surface treatment of the paper is thought to prevent the toner from attaining the same degree of fiber penetration as the first applied image since upon abrading the surface, this later applied toner is found to be removed before the first image. By this technique, fuser control is no longer critical and wide operational latitude is possible. Optionally, of course, the pressure and/or temperature of the pressure rolls in the technique described could be slightly decreased during the second image fixation to provide for even less fixing of the removable image.

Any suitable silicone oil may be used in this aspect of the invention, such as the silicone oil available under the designation SF-96-100 from General Electric Co., or the silicone oil available under the designation 200 from Dow Corning Corp. It is found to be preferred to dispense the silicone oil at a rate of from about 0.0017 to about 0.024 milliliters per square foot of transfer surface.

Any suitable release or offset preventing material may be used. Typical such materials include such non-pigmented liquids as the higher fatty acid esters and others.

It will be understood that the concept of release agent fusing to improve the removability of a subsequently applied toner image may also be used in the practice of using xerographic obscuration layers or patterns as described in copending application Ser. No. 604,749.

In addition, those skilled in the art will upon reading of this application, think of other variations such as adding materials to those described to synergize, enhance or otherwise modify the properties of the materials described herein. For example, plasticizers and other additives may be added to toners to change and control the temperature at which various toners melt, thus providing another variable to control fixing. Also the type of transfer material used or treatment of the toner receiving surface thereof may be varied to control the fix.

Also, the removable, confusing information may be placed on the transfer surface in a random or a patterned fashion, the permanent information may be slightly misregistered to aid in disguising it, and the complete absence of any remaining information after removal may be used to convey information to the student.

Also, in the preferred method of making devices according hereto, wherein pressure fixing is employed with a toner release agent on one of the rollers, various solvents may be added to liquid release agents and also dyes to provide for a colored tint to the paper, if desired.

It will be understood that various changes in the details, materials, steps and arrangements of parts which have been herein described and illustrated in order to explain the nature of the invention, will occur to and may be made by those skilled in the art upon a reading of this disclosure, and such changes are intended to be included within the principle and scope of this invention.

What is claimed is:

1. A device for selectively indicating information comprising a support having response areas for presenting information for selection, permanent printing indicative of meaningful information permanently fixed to said support within a response area, and removable printing indicative of confusing information removably fixed to said support within a response area, said meaningful and confusing information being substantially legible even when said permanent and removable printing are fixed over one another on said support, said permanent and removable printing being substantially similar such that an observer cannot determine which information is permanent and which is removable whereby the information within a response area is selected by attempting to remove the printing therein with the failure to remove printing identifying meaningful information.

2. The device of claim 1 further including overlay printing removably fixed to said support over said permanent and removable printing to obscure that the meaningful information is permanent and the confusing information is removable.

3. The device of claim 1 wherein each response area includes both permanent and removable printing.

4. The device of claim 1 wherein said removable printing is abradably removable from said support.

5. The device of claim 1 wherein at least said removable printing includes a xerographic toner material.

6. The device of claim 5 wherein said xerographic toner material is fixed to said support by greater than a class 1 but less than a class 3 fix.

7. The device of claim 1 wherein a response area represents an answer to a question with meaningful information within the response area indicating whether the response area represents a correct or incorrect answer to the question and with confusing information within the same response area falsely indicating whether the response area represents a correct or incorrect answer to the question.

8. The device of claim 1 wherein a response area includes information indicative of a human face having frown and grin portions with said permanent printing indicating either the grin or frown portion depending upon which constitutes meaningful information and with said removable printing indicating either the grin or frown portion depending upon which constitutes confusing information.

* * * * *

UNITED STATES PATENT OFFICE

CERTIFICATE OF CORRECTION

Patent No. 3,877,155 Dated April 15, 1975

Inventor(s) Stephen F. Royka and Robert G. Martin

It is certified that error appears in the above-identified patent and that said Letters Patent are hereby corrected as shown below:

Column 1, line 8, "for" should read --as--.

Column 2, line 25, "sponse" should read --sponsive--.

Column 2, line 51, "system" should read --systems--.

Column 2, line 58, "invention" should read --inventive--.

Column 4, line 64, "indicates" should read --indicate--.

Column 5, line 16, "examiner's" should read --examinee's--.

Column 5, line 46, "characters" should read --character--.

Column 6, line 30, "may" should read --must--.

Column 8, line 5, "therto" should read --thereto--.

Column 10, line 50, "taken" should read --takes--.

Signed and Sealed this

*nineteenth* Day of *August 1975*

[SEAL]

*Attest:*

RUTH C. MASON
*Attesting Officer*

C. MARSHALL DANN
*Commissioner of Patents and Trademarks*